United States Patent
Valiveti et al.

(10) Patent No.: US 8,412,040 B2
(45) Date of Patent: Apr. 2, 2013

(54) METHOD AND APPARATUS FOR MAPPING TRAFFIC USING VIRTUAL CONCATENATION

(75) Inventors: Radhakrishna Valiveti, Fremont, CA (US); Ping Pan, San Jose, CA (US); Ravi Tangirala, San Jose, CA (US); Edward E. Sprague, Woodside, CA (US); Rajan Rao, Cupertino, CA (US); Biao Lu, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 85 days.

(21) Appl. No.: 13/079,292

(22) Filed: Apr. 4, 2011

(65) Prior Publication Data

US 2012/0251106 A1 Oct. 4, 2012

(51) Int. Cl.
*H04J 14/00* (2006.01)
(52) U.S. Cl. .......................................... 398/52
(58) Field of Classification Search ............... 398/52
See application file for complete search history.

(56) References Cited

U.S. PATENT DOCUMENTS

| | | | |
|---|---|---|---|
| 7,586,909 B1* | 9/2009 | Walrand et al. | 370/388 |
| 7,590,102 B2* | 9/2009 | Varma | 370/351 |
| 2010/0115174 A1* | 5/2010 | Akyol et al. | 710/316 |

\* cited by examiner

*Primary Examiner* — Shi K Li
(74) *Attorney, Agent, or Firm* — Dunlap Codding P.C.; David L. Soltz

(57) ABSTRACT

A node comprising a packet network interface, an ethernet switch, an optical port, and a distribution engine. The packet network interface adapted to receive a packet having a destination address and a first bit and a second bit. The ethernet switch is adapted to receive and forward the packet into a virtual queue associated with a destination. The optical port has circuitry for transmitting to a plurality of circuits. The distribution engine has one or more processors configured to execute processor executable code to cause the distribution engine to (1) read a first bit and a second bit from the virtual queue, (2) provide the first bit and the second bit to the at least one optical port for transmission to a first predetermined group of the plurality of circuits.

22 Claims, 6 Drawing Sheets

METHOD AND APPARATUS FOR MAPPING TRAFFIC USING VIRTUAL CONCATENATION

FIELD OF DISCLOSURE

The inventive concept disclosed herein generally relates to a method and Apparatus for transporting data flows over optical networks, and more particularly but not by way of limitation, to a method and apparatus for transporting high-speed packet flows over optical networks having multiple circuits with virtual concatenation techniques to evenly distribute bits from the packet flows across multiple circuits using optical channel data units.

BACKGROUND

Information networks are well known in the art and function to transmit information such as computer data between various computer systems operably coupled to the information network. Generally there are two types of information networks—circuit switched and packet switched. Circuit switched networks operate by creating, maintaining and transmitting data over a circuit between two network nodes. This circuit typically has a fixed bandwidth which poses some disadvantages where the amount of data is large relative to the link's bandwidth, as it may take a long time for all of the data to be transmitted. Optical Transport Networks (which will be referred to as "OTN" or "OTNs" herein) are one example of circuit-switched networks.

Multiprotocol label switching (MPLS) is a packet switching technology which directs and carries data from one network node to the next node. The multiprotocol label switching mechanism assigns labels to data packets. Packet forwarding decisions from one node to the next node are made solely on the contents of the label for each data packet, without the need to examine the data packet itself.

Generalized Multiprotocol Label Switching (GMPLS) is a type of protocol which extends MPLS to encompass network schemes based upon time-division multiplexing (e.g. SONET/SDH, PDH, G.709), wavelength multiplexing, and spatial multiplexing (e.g. incoming port or fiber to outgoing port or fiber). Multiplexing, such as time-division multiplexing is when two or more signals or bit flows are transferred over the same link. In particular, time-division multiplexing (TDM) is a type of digital multiplexing in which two or more signals or bit flows are transferred simultaneously as sub-channels in one OTN communication link, but are physically taking turns on the communication link. The time domain is divided into several recurrent timeslots of fixed length, one for each sub-channel. After the last sub-channel, the cycle starts all over again. Time-division multiplexing is commonly used for OTN circuit mode communication with a fixed number of links and constant bandwidth per link. Time-division multiplexing differs from statistical multiplexing, such as packet switching, in that the timeslots are serviced in a fixed order and pre-allocated to the links.

The Optical Transport Hierarchy (OTH) supports the operation and management aspects of OTNs of various architectures, e.g., point-to-point, ring and mesh architectures. One part of the optical transport hierarchy is a multiplex hierarchy, which is a hierarchy consisting of an ordered sequence of tandem digital multiplexers that produce signals of successively higher data rates at each level of the hierarchy.

Shown in FIG. 1 is an exemplary multiplexing hierarchy specified by way of optical channel data units, i.e., ODUj, where j varies from 0 to 4; and optical channel transport units, i.e., OTUk, where k varies from 1 to 4. The optical channel data units refer to a frame format for transmitting data which can be either fixed in the amount of data and data rate or have an arbitrary data rate set by a user. Examples of optical channel data units that are fixed in the amount of data and data rate include those specified by ODU0, ODU1, ODU2, ODU3, and ODU4. One or more low order ODU containers can be multiplexed into a higher order ODU container. An example of a recently developed optical channel data unit that has an arbitrary data rate is referred to in the art as ODUflex. ODUflex containers can be sized to fit the client's bit rate thereby maximizing available bandwidth usage. Optical channel data units may hereinafter be referred to as ODUs, ODU containers, ODUj containers.

Other OTN traffic management developments are Virtual Concatenation (VCAT) and link capacity adjustment scheme (LCAS) protocol, both of which allow more efficient use of existing fixed-bandwidth circuits associated with circuit-switched OTN infrastructures. For example, these protocols are utilized in transmission of ethernet over OTN data traffic within networks, and in numerous other data transmission applications. The VCAT and LCAS protocols are described in greater detail in, for example, ITU-T standards documents G.7043 and G.7042, respectively, which are incorporated herein by reference in their entirety.

VCAT is an inverse multiplexing technique, which generally creates a large capacity payload container by distributing the client signal bits over multiple lower capacity signals which are time division multiplexed onto common transmission facilities whenever such multiplexing is possible. This allows a given source node of a network to form a virtually-concatenated group (VCG) which includes multiple members each associated with a corresponding data stream. The different data streams may then be transmitted over diverse routes through the OTN from a source node to a destination node. The destination node recombines the streams to reconstruct the original data stream injected by the source.

One example of packet-switched network for Local Area Networks (LAN or LANs) is defined by the IEEE 802 standards. These standards have found widespread acceptability and many LANs conform to these standards. A popular variation on one of the IEEE standards, IEEE Std. 802.3, 2000 Edition, is known as "Ethernet." Traditional ethernet, as per the 802.3 standard, is a LAN utilizing a linear serial bus and uses a scheme for managing the LAN known as Carrier Sense Multiple Access with Collision Detection ("CSMA/CD"). CSMA/CD ensures that two computers transmitting at the same time detect collisions caused by simultaneous transmission, subsequently retransmit any packets which were corrupted by the simultaneous transmission during the previous transmission attempt.

The Institute of Electrical and Electronic Engineers (IEEE) 802.3ad standard defines a link aggregation Control Protocol (LACP) for use by the control process within each device employing link aggregation to verify configurations and to send packets through each of the communication links within the aggregated logical link. The standard also provides mechanisms for adding and removing ethernet links from the aggregated logical link. The IEEE 802.3ad standard works at a variety of speeds. Particularly, the IEEE 802.3ad standard applies to 10 M, 100 M, and 1000 M bit/second speeds and aggregated links can be formed using any of these physical ethernet interfaces as LAG members. The LAG members are of the same speed.

Link aggregation (LAG) is a conventional technique for aggregating standard ethernet links. The same technique can be applied to transporting packet traffic over a collection of circuits within the OTN network. An advantage of LAG is that it provides more bandwidth than a single communication link and it provides some redundancy in the case of the failure of one or more of the participating communication links. For example, a user could set up four 100 M bit/second links running in parallel between two nodes, but both nodes would handle the traffic as if there were a single 400 M bit/second link between them. In a typical implementation of LAG, the node performs a look-up on the packet header and then forwards packets to the processor which is responsible for distributing the offered traffic among the LAG members; this processor parses the packet headers to identify sub-flows and then directs each sub-flow into one of the LAG members, in a deterministic fashion. However, a major disadvantage is that the traffic distribution mechanism of LAG is based on static classification rules (based on combination of fields contained in data packets). Such rules have no knowledge of the actual bandwidth requirements of the packet flows. As a result, the performance of a LAG implementation is sensitive to the actual data flowing through the LAG, and becomes inefficient at data rates in excess of 1 Gbit/sec. At these data rates, link aggregation may result in uneven spread of the packets over the available communication links. This can result in underutilizing the available bandwidth of some of the communication links, while placing more traffic than a communication link can handle through other communication links, which results in congestion and dropped packets. Further, because packets traveling through different communication links arrive at different times, the packets may arrive at the end node out of sequence. The end node typically uses a large deskewing buffer to store data until all packets have arrived. Then, the end node reassembles the packets in the correct order, which causes additional time delays.

Packet switched networks, may classify the original data into packets, which can be sent through the network via different communication links often out of sequence. Each of the packets is labeled, to allow the destination node to identify and reorder the packets into the original data.

Newer information networks have hardware designed to use packet switching due to its better efficiency. Many existing networks have hardware originally designed for circuit-switching. Several methods have been developed to utilize existing OTNs to efficiently handle packet-switched traffic.

To that end, a need exists for a method and apparatus for transporting high-speed packet flows over an OTN network that provides a more even spread of the packets over multiple circuits than was previously possible with LAGs as constructs in networking solutions, thereby increasing bandwidth utilization and reducing congestion. It is to such an apparatus and method that the inventive concept disclosed herein is directed.

SUMMARY OF THE DISCLOSURE

In one aspect, the present disclosure is directed to a node. A node comprising a packet network interface, an ethernet switch, an optical port, and a distribution engine. The packet network interface is adapted to receive a packet having a destination address and a first bit and a second bit. The ethernet switch is adapted to receive and forward the packet into a virtual queue associated with a destination. The optical port has circuitry for transmitting to a plurality of circuits, such as TDM circuits. The distribution engine has one or more processors configured to execute processor executable code to cause the distribution engine to (1) read a first bit and a second bit from the virtual queue, (2) provide the first bit and the second bit to the at least one optical port for transmission to a first predetermined group of the plurality of circuits.

It should be understood that the node can be provided with one or more distribution engine and each of the distribution engine can read one or more virtual queues with each virtual queue associated with a different predetermined group of the plurality of circuits.

The predetermined group of the plurality of circuits, in one aspect, is provided with a first circuit and a second circuit. The first and second circuits can be different TDM circuits. The first bit can be provided to the first circuit and the second bit can be provided to the second circuit.

In order to reconstruct the packet at a destination node, the distribution engine further provides a first set of deskewing markers to the at least one optical port indicating a first sequence of the first bit and the second bit to the predetermined group of the circuits.

The first bit can be mapped into a first arbitrary rate optical channel data unit container, and the second bit can be mapped into a second arbitrary rate optical channel data unit container, and wherein the first and second arbitrary rate optical channel data unit containers have a same data rate.

Alternatively, the first bit can be mapped into a first fixed rate optical channel data unit container, and the second bit can be mapped into a second fixed rate optical channel data unit container, and wherein the first and second fixed rate optical channel data unit containers have a same data rate.

Preferably, the distribution engine provides the first bit and the second bit to the at least one optical port in a predetermined sequence. For example, the predetermined sequence can be a round-robin fashion.

In one embodiment, the distribution engine provides the first bit to a first ODU container, and the second bit to a second ODU container.

In another aspect, the present disclosure provides a method in which a packet is received by circuitry of a node. The packet is stored in a first queue according to destination of the packet by an ethernet switch comprising one or more processor. The first and second bits are mapped from the packet within the first virtual queue into a first group of optical channel data unit containers within a first virtual concatenated group, and the first group of optical channel data unit containers within the first virtual concatenated group are transmitted to a first destination node.

In a further aspect, the step of mapping the first bit and the second bit from the packet within the first virtual queue further comprises adding deskewing markers into the first set of optical channel data unit containers. The packet can be reconstructed at the first destination node from multiple data streams extracted from the first set of optical channel data unit containers using the deskewing markers.

BRIEF DESCRIPTION OF THE DRAWINGS

As discussed above, the present disclosure describes methods and apparatus for more efficiently transporting high-speed data flows over optical networks having multiple circuits by using Virtual Concatenation techniques to evenly distribute bits and/or groups of bits from the packet flows across the multiple circuits using optical channel delivery unit containers, and then re-assembling the data within the optical channel delivery unit containers into packets at a destination node.

Like reference numerals in the figures represent and refer to the same element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION

Figure 1:
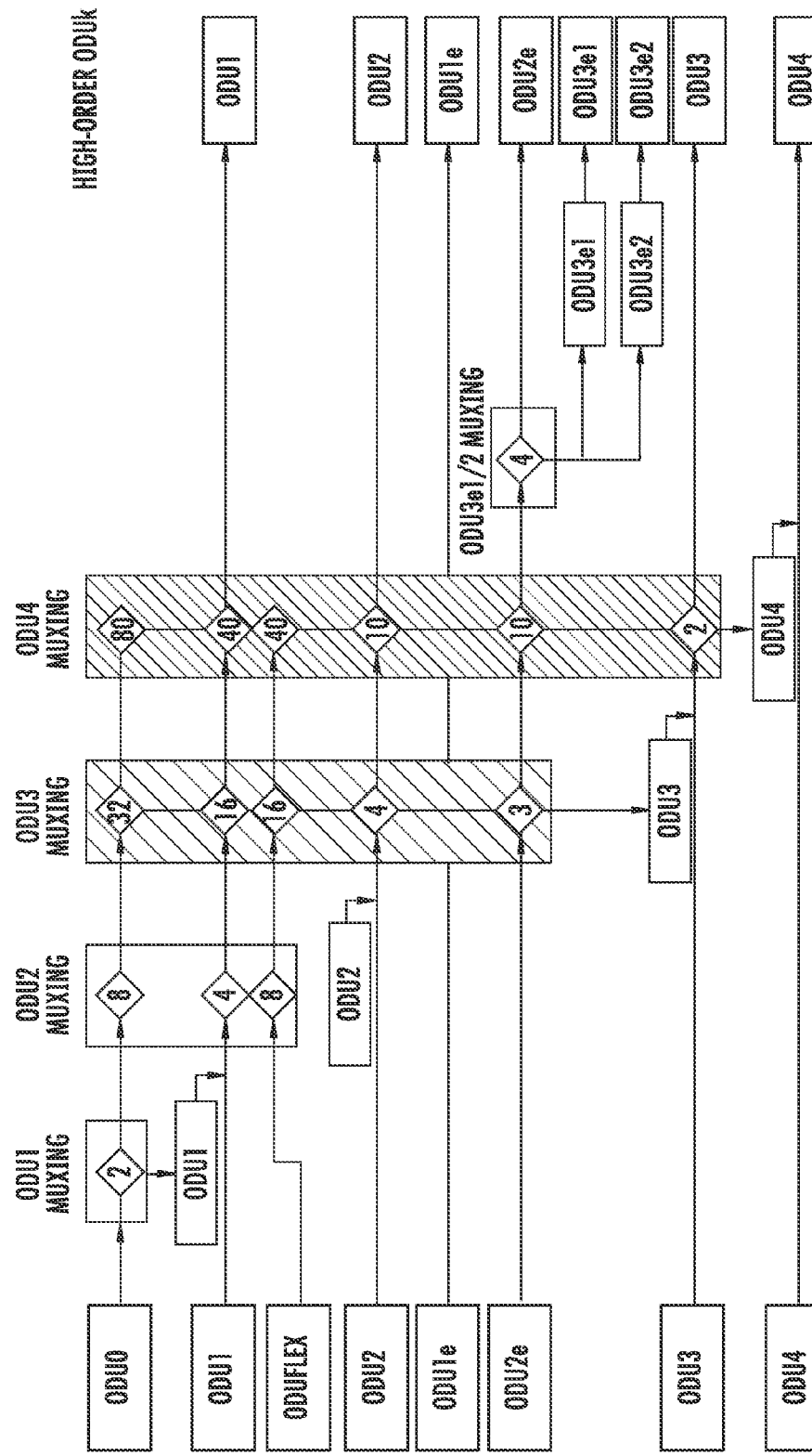
FIG. 1 is a diagram of a prior art ODU multiplexing hierarchy utilized for communicating between nodes within an optical transport network.

The prior art methods for transporting high-speed packet flows over optical networks using link aggregation groups fail to evenly distribute data from the packet flows over the available links, which results in failure to utilize the full available bandwidth of the links and/or overloading certain links, which in turn may result in dropped packets. The inventive concept disclosed herein overcomes such prior art deficiencies by assigning packets within the packet flows to virtual concatenation groups (VCG) based upon destination, and then evenly distributing data from the packets within the virtual concatenation groups into predetermined groups of plurality of circuits which may be referred to herein as VCG members. The inventive concept disclosed herein can utilize the full available bandwidth of the set of circuits without overloading certain circuits relative to other circuits which results in increased utilization of available bandwidth and less dropped packets. The distribution of data directed to the VCG, among the VCG members is preferably done without performing a packet lookup (which would typically be required in traditional LAG based traffic distribution mechanism). Such forwarding does not depend upon an application which originally generated the packets or for which the packets are being used. Thus, the inventive concept disclosed herein can be considered to be application-agnostic, i.e., not dependent upon any particular application that generated or used the packets as described in detail below.

Before explaining at least one embodiment of the inventive concept disclosed herein in detail, it is to be understood that the inventive concept is not limited in its application to the details of construction and the arrangement of the components or steps or methodologies set forth in the following description or illustrated in the drawings. The inventive concept disclosed herein is capable of other embodiments or of being practiced or carried out in various ways. Also, it is to be understood that the phraseology and terminology employed herein is for the purpose of description and should not be regarded as limiting in any way.

In the following detailed description of embodiments of the disclosure, numerous specific details are set forth in order to provide a more thorough understanding of the inventive concept. However, it will be apparent to one of ordinary skill in the art that the inventive concept within the disclosure may be practiced without these specific details. In other instances, well-known features have not been described in detail to avoid unnecessarily complicating the instant disclosure.

As used herein the term "one or more" shall be interpreted to mean only one, two, three, four, five, six, or a plurality of the element(s) it quantifies. The term "a plurality" shall likewise be interpreted to mean two, three, four, five, six, or a plurality of the element(s) it quantifies. The term "two or more" shall be interpreted to mean only two, three, four, five, six, or a plurality of the elements it quantifies.

As used herein the designations "a-n", "a-m", "1-n", "a-c", "n", "m", and other similar designations, whether lower case or capitalized, are meant to denote two or more or a plurality of the element such designations are appended to. Such designations are used for clarity of description only to conveniently denote two or more or a plurality of similar elements, and are not to be construed as limiting in any way. For example, a notation "a-b" following an element is to be construed to denote two or more or a plurality of such element. Similarly, a notation "a-n" or "1-n" following an element is to be construed to denote two or more similar elements.

The inventive concept(s) disclosed herein is directed to methods and apparatus for transporting high-speed packet flows over OTNs with multiple circuits using optical channel data unit containers and Virtual Concatenation techniques and then reconstructing the packet flows from the multiple circuits at a destination node.

Figure 2:
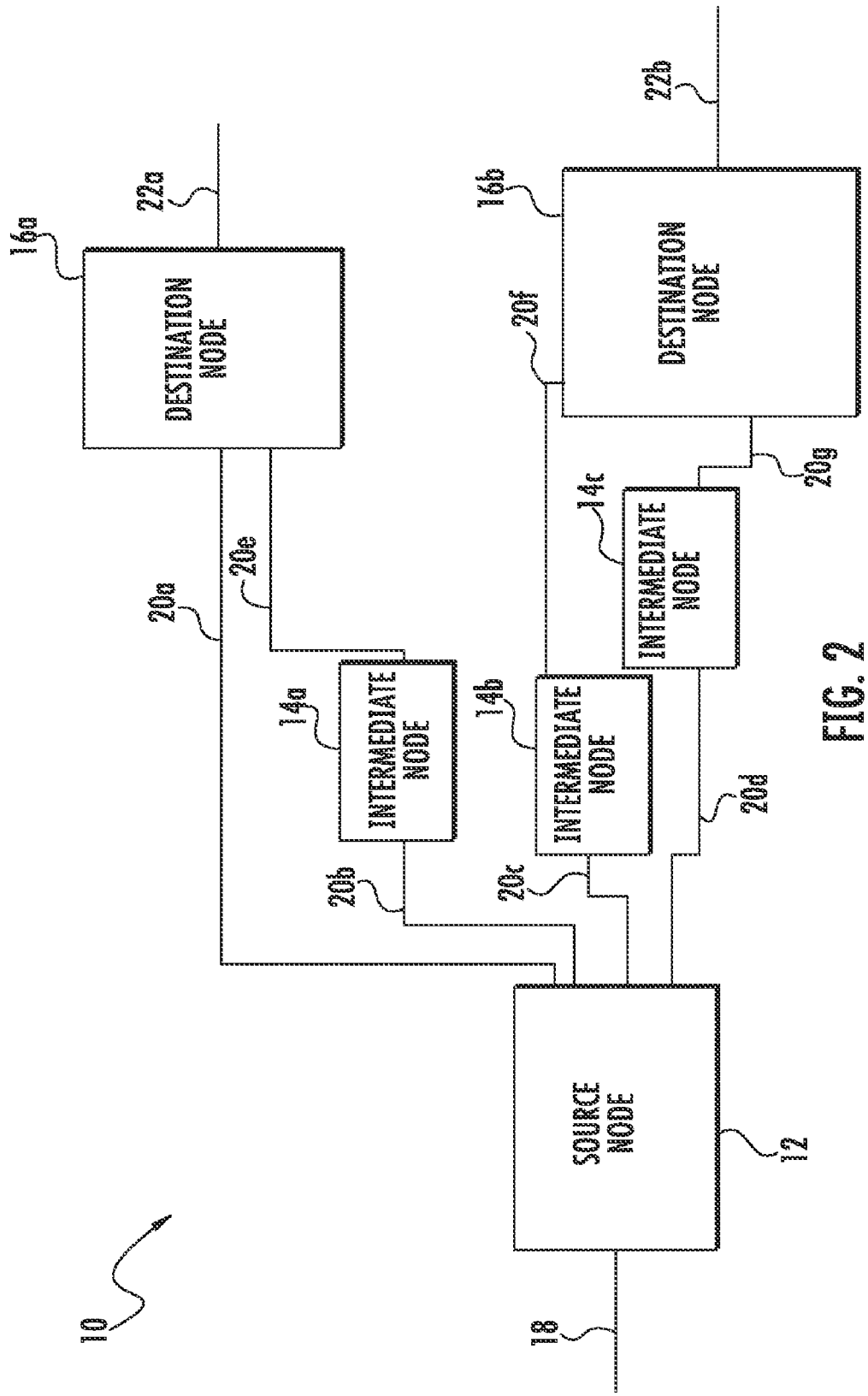
FIG. 2 is a block diagram of an embodiment of an optical transport network according to the present disclosure.

Referring now to FIG. 2, shown therein is an exemplary OTN 10 according to the present disclosure. The OTN 10 generally comprises at least one source node 12, at least two intermediate nodes 14, and at least two destination nodes 16. Only one source node 12, three intermediate nodes 14a-c, and two destination nodes 16a-b are shown for purposes of clarity, however, it should be understood that the OTN 10 can have any number of source nodes 12, intermediate nodes 14, and destination nodes 16.

The source node 12 is capable of receiving data via one or more links 18a-n, only one being shown in FIG. 2 for purposes of clarity. The data received via the links 18a-n may be provided from one or more of a processor, a computer, a server, a data center, a network, and/or a network node, and combinations thereof, for example. High-speed packet flows comprising a plurality of packets including bits and/or bytes, enter the OTN 10 at the source node 12 via links 18a-n, and are transmitted to one or more of the destination nodes 16a-b through one or more intermediate nodes 14a-c, or directly between the source node 12 and the destination node(s) 16 via one or more links 20a-d. The links 20a-d can be physical communication links, such as an optical fiber, electrical cable, wireless transmission, and combinations thereof, for example. Data leaves the destination nodes 16a-b via one or more links 22a-b.

The intermediate nodes 14a-c forward the data between the source node 12 and the destination nodes 16a-b. One or more intermediate nodes 14a-c can be utilized to transfer the data from the source node 12 to one or more destination nodes 16a-b. For example, data can be transmitted from the source node 12 to the destination node 16a via the intermediate node 14a. Data may also travel through two or more intermediate nodes 14b and 14c prior to reaching the destination node 16b. Further, data may go directly from the source node 12 to the destination node 16a via the link 20a, without passing through any of the intermediate nodes 14a-c. It is to be understood that intermediate nodes 14a-c may have structures similar or substantially identical to the structure of the source node 12 described above. It is to be further understood that a single node may operate as the source node 12, the intermediate node 14, and the destination node 16, preferably at the same time.

The at least two destination nodes 16a-b can be similar and/or substantially identical in structure to the source node 12. Such configuration allows a network constructed in accordance with the instant disclosure to handle traffic in both directions, preferably at the same time, by providing source nodes 12 that can function as destination nodes 16, and destination nodes 16a-b that can function as source nodes 12.

Figure 3:
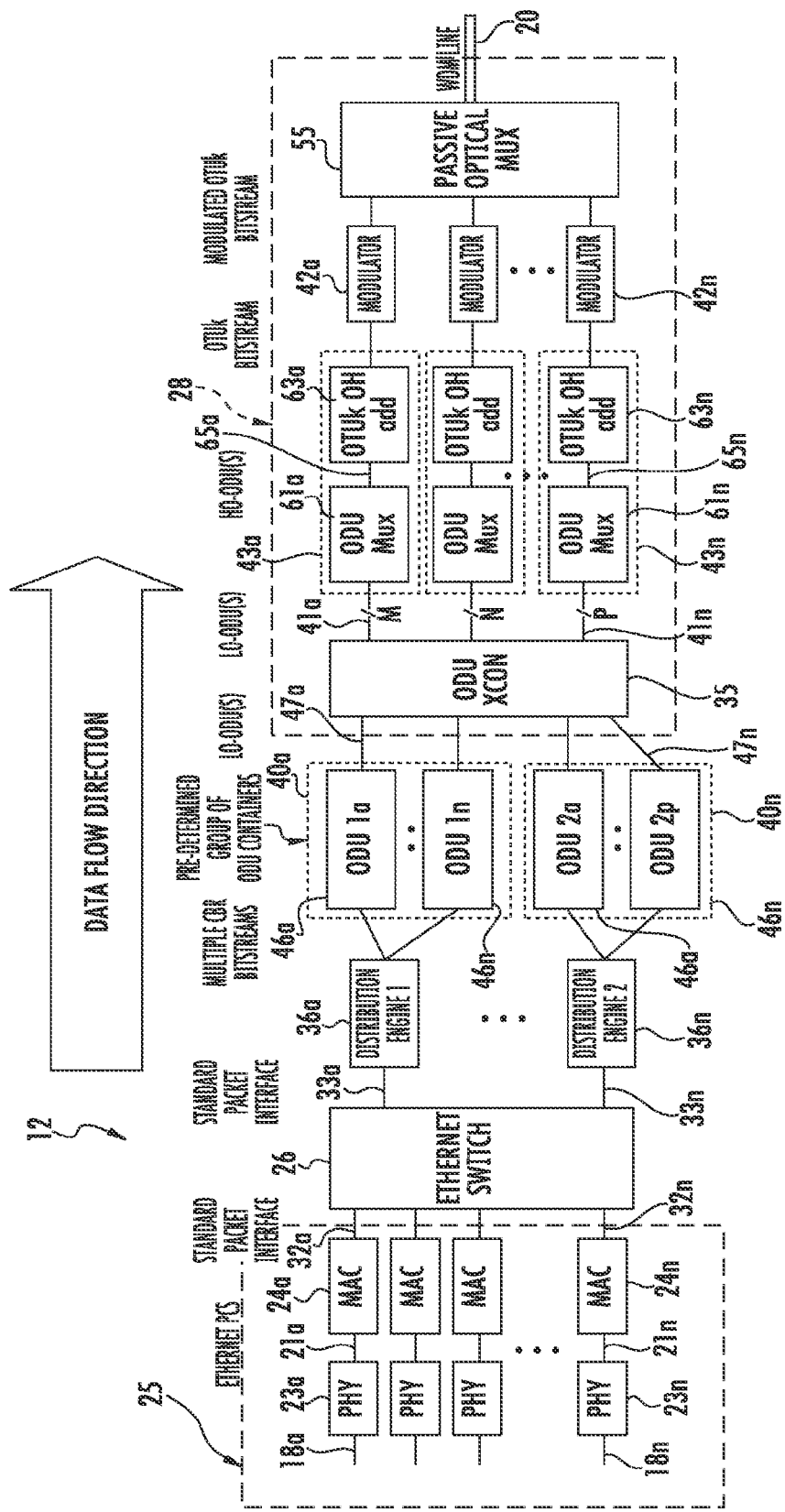
FIG. 3 is a hardware diagram of an embodiment of a source node according to the present disclosure.

Referring now to FIG. 3, the source node 12 comprises a packet network interface 25 having one or more physical interfaces 23a-n (PHY) and one or more media access control 24a-n (MAC), an ethernet switch 26, and an optical port 28. Typically, the source node 12 is considered to be an optical-electrical-optical device in which optical signals are received via links 18a-n, converted into electrical signals, and then converted back into optical signals for communicating on the links 20a-d. This is how the source node 12 will be described below.

The physical interfaces 23a-n can receive data from the links 18a-n. The circuitry of the physical interfaces 23a-n can include optical to electrical converters, such as a photodiode, as well as one or more processors (not shown) and/or a field programmable gate array (not shown) for interpreting the data received from the physical interfaces 23a-n and converting such data into electrical packets having bits and/or bits. The physical interfaces 23a-n may be implemented as any conventional physical interfaces capable of receiving and/or transmitting data.

As shown in FIG. 3, the media access control 24a-n communicate with the one or more physical interfaces 23a-n via busses 21a-n capable of transferring data between the physical interfaces 23a-n and the media access control 24a-n. The media access control 24a-n communicates with the ethernet switch 26 via one or more busses 32a-n capable of transferring data between the packet network interface 25 and the ethernet switch 26. As a non-limiting example, the busses 32a-n may be implemented in compliance with the Interlaken standard.

The ethernet switch 26 may be any conventional switching circuit. Switching circuits are well known in the art and a detailed description of how to make and use a switching circuit is not deemed necessary herein to teach one skilled in the art how to make and use the source node 12. The optical port 28 can be a line side of Wavelength Division Multiplexing (WDM) equipment.

The source node 12 is also provided with one or more distribution engine 36a-n, and the optical port 28 is provided with an ODU cross-connect (XCON) 35, two or more multiplexers 43a-n, a plurality of modulators 42a-n, and a passive optical mux 55.

The distribution engine 36a-n can communicate with the ethernet switch 26 via busses 33a-n, with one of the distribution engines 36a-n preferably communicating with one of the busses 33a-n. The distribution engines 36a-n function to encapsulate packet streams received from the ethernet switch 26, preferably to a Generic Framing Procedure frame mapped (GFP-F) constant bit rate (CBR) streams having a plurality of bits. The distribution engines 36a-n may perform GFP-F idle padding in order to compensate for any gaps in the packets streams as will become apparent to a person of ordinary skill in the art presented with the instant disclosure. Alternatively, the distribution engines 36a-n may encode a packet stream received from the ethernet switch 26 to a CBR stream composed of ethernet Physical Coding Sublayer (PCS) blocks or 66 bits which are referred to as "PCS codewords" in the art. It is to be understood that other encapsulation methods may be used by the distribution engine 36a-n as will be understood by a person of ordinary skill in the art presented with the instant disclosure.

The distribution engines 36a-n can be implemented as one or more processors (not shown) capable of executing processor executable code, such as for example a CPU, a microprocessor, a FPGA, and combinations thereof. The functionality of the distribution engines 36a-n are similar, and generally distribute bits or groups of bits from the CBR into a predetermined group 40a-n of ODU containers 46a-n as shown in FIG. 3 using a predetermined sequence, such as a round robin.

The ODU XCON 35 receives the predetermined groups 40a-n of ODU containers 46a-n via busses 51a-n. The ODU XCON 35 communicates with the multiplexers 43a-n via paths 41a-n each of which can have one or more lanes as set forth with the notation /M, IN and /P in FIG. 3. The ODU XCON 35 may be implemented as any conventional cross-connect. The making and using of cross-connects is known in the art. The ODU XCON 35 functions to rearrange and interconnect lower-level bit streams, such as ODU bit streams, as will be described in more detail below. The busses 51a-n and 41a-n function to transfer data between the distribution engines 36a-n, the ODU XCON 35, and the multiplexers 43a-n.

The multiplexers 43a-n, comprise an ODU Mux 61a-n and an OTUk OH 63a-n, communicating via paths 65a-n. The multiplexers 43a-n receive data from the ODU XCON 35, and the OTUk OH 63a-n adds OTUk overhead and then transmits data to the modulators 42a-n.

The modulators 42a-n receive the electrical signals indicative of the optical channel transport unit (OTU) containers from the busses 48a-n, and serve to convert electrical signals into optical signals which are then transmitted to the passive Optical Mux 55 via bus 49a-n. The modulators 42a-n can be implemented as any conventional modulators, and may be provided with a laser and/or a light emitting diode which can be controlled by the electrical signals received from the multiplexers 43a-n, for example.

The passive optical mux 55 can be implemented as any conventional passive optical multiplexer as will be understood by a person of ordinary skill in the art presented with the instant disclosure. The passive optical mux 55 functions to forward OTUs onto the links 20a-d.

Figure 4:
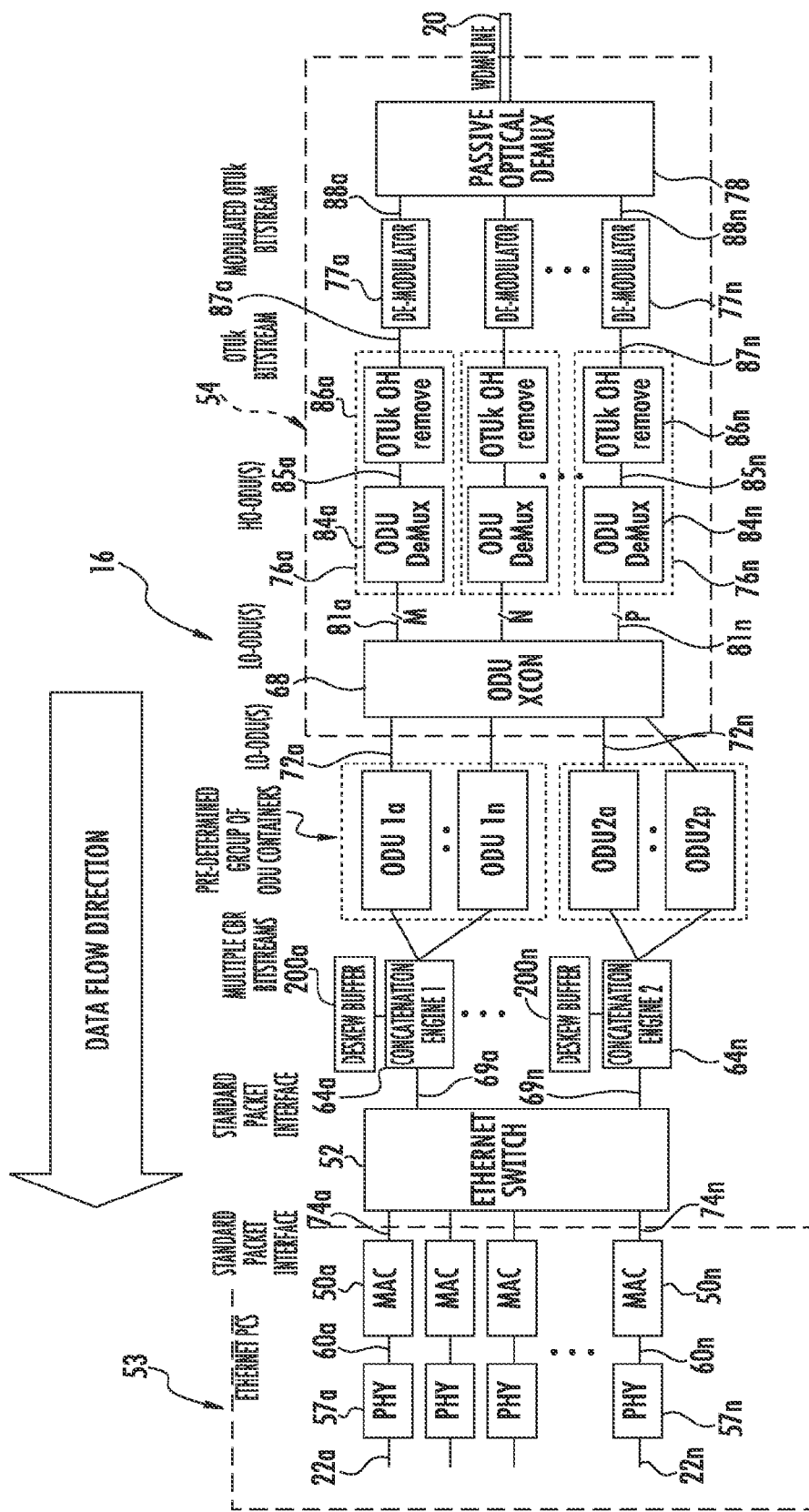
FIG. 4 is a hardware diagram showing an embodiment of a destination node according to the present disclosure.

Referring now to FIG. 4, the destination node 16 comprises a packet network interface 53 having one or more physical interfaces 57a-n (PHY), one or more media access control 50a-n (MAC), an ethernet switch 52, and an optical port 54. The optical port 54 can be a line side of Wavelength Division De-Multiplexing equipment. Preferably, the destination node 16 can be an optical-electrical-optical device in which optical signals are received, converted into electrical signals, and then converted back into optical signals for communicating on the links 22a-c. This is how the destination node 16 will be described below.

The physical interfaces 57a-n can be any conventional physical interfaces and may be constructed similarly to the physical interfaces 23a-n. The physical interfaces 57a-n communicate with the media access control 50a-n via one or more busses 60a-n capable of transferring data between the physical interfaces 57a-n and the media access control 50a-n. The busses 60a-n can be constructed similar to the busses 32a-n. The physical interfaces 57a-n are capable of transmitting data to the links 22a-n.

The media access control 50a-n may be implemented similarly to the media access control 24a-n. The media access control 50a-n communicates with the ethernet switch 52 via busses 74a-n, which may be implemented similarly to busses 32a-n.

The ethernet switch 52 may be any conventional switching circuit. Switching circuits are well known in the art and a detailed description of how to make and use a switching circuit is not deemed necessary herein to teach one skilled in the art how to make and use the destination node 16. In general, the ethernet switch 52 can communicate with concatenation engines 64a-n via one or more busses 69a-n, which can be constructed similarly to the busses 60a-n. The ethernet switch 52 functions to receive and forward the plurality of packets containing bits within the packet flows between the media access controls 50a-n and the concatenation engines 64a-n.

The optical port 54 comprises one or more ODU XCON 68, a de-multiplexer 76a-n, one or more de-modulators 77a-n, and a passive optical de-mux 78.

The concatenation engine 64a-n can be implemented as one or more processors (not shown) capable of executing processor executable code, such as for example a CPU, a microprocessor, a FPGA, and combinations thereof. The functionality of the concatenation engine 64a-n will be described in more detail with reference to FIG. 6 below. The concatenation engine 64a-n can communicate with the ODU XCON 68 via busses 72a-n.

Busses 72a-n can be electrical communication links, such as copper wires on a printed circuit board for example.

The ODU XCON 68 communicates with the ODU de-multiplexer 76a-n via bus 81a-n.

The de-multiplexer 76a-n comprises an ODU De-Mux 84a-n, communicating with an OTUk OH Remover 86a-n via bus 85a-n. The OTUk OH Removers 86a-n remove the OTUk overhead, and then the De-Mux 84a-n demultiplex the signals. The de-modulators 77a-n communicate with the de-multiplexers 76a-n via bus 87a-n. The passive optical de-mux 78 can communicate with the de-modulators 77a-n via bus 88a-n.

It is to be understood that the terms "source node", "intermediate node," and "destination node" are used solely for purposes of clarity. Such terms serve to differentiate nodes only in relation to the path certain information takes through the OTN 10, and are not intended to distinguish nodes based on their structure and/or function in any other way. The difference in node functionality is due to the direction of traffic through a node, for example, the source node(s) 12 accepts incoming packet traffic through the packet network interface 25 and transmits outgoing traffic through the optical port 28. The destination node(s) 16 accepts incoming traffic through the optical port 54 and transmits outgoing traffic through the packet network interface 53. While the source node 12 and the destination node 16 are shown in two separate figures and described separately, it is to be understood that the source node 12 and the destination node 16, i.e. a node according to the instant disclosure may be configured with the hardware and software to operate as both the source node 12 and the destination node 16, preferably at the same time.

Returning to FIG. 3, in operation, the source node 12 receives two or more packet flows having bits via the one or more physical interfaces 23a-n. The ethernet switch 26 forwards the packet flows to the distribution engines 36a-n. As will be understood by one skilled in the art, packets typically include a plurality of bits comprising a header storing control information for forwarding the packet, as well as a payload storing a plurality of bits which is typically user data. The control information typically includes source and destination addresses, error checking code such as a checksum, and sequencing information. The two or more packet flows preferably comprise a first packet having a first bit and a second bit, and a second packet having a third bit and a fourth bit.

The distribution engine 36a, for example, is provided with mapping logic. When a packet is received by the distribution engine 36a via the busses 33a, the mapping logic distributes the bit steams to the predetermined group 40a of ODU containers 46a-n, preferably on a bit-by-bit or groups of bits basis. The distribution engine 36 may populate the OPUk-OH of each of the ODU containers that belong to the VCG associated with the distribution engine 36a. Alternatively, the distribution engine 36a distributes the PCS bit stream on a PCS code word basis to the predetermined group 40a of ODU containers 46a-n. The distribution engine 36a inserts deskewing markers 94 (FIG. 5) preferably into the payload portion of each of the ODU containers 461-n that belong to the VCG group associated with the distribution engine 36a. The distribution engine 36a reads one or more virtual queues, and the ethernet switch 26 assigns packets to the distribution engine 36a, which can be concatenated by assigning packets to one of the virtual queues based on destination. The ethernet switch 26 assigns the packets into one of the virtual queues which can be read by the distribution engine 36a. Each of the virtual queues preferably has a predetermined assignment based upon a destination address. In the example shown in FIG. 2, assume that the destination node 16a is located within New York, and the destination node 16b is located within Chicago. The distribution engine 36a has been preassigned to a destination address in New York, and the distribution engine 36n has been preassigned to a destination address in Chicago. Assuming that the packet has a destination address of New York, then the packet will be assigned and directed to a virtual queue that is read and monitored by the distribution engine 36a. Assuming that the packet has a destination address of Chicago, then the packet will be assigned and directed to a virtual queue that is read and monitored by the distribution engine 36n.

The mapping logic 92 of the distribution engine 36a may be provided with a plurality of map engines with each map engine preferably monitoring a particular one of the virtual queues and then providing or otherwise transmitting bits and/or bits within the packet to the predetermined group 40a of the ODU containers 46a-n assigned to or associated with the virtual queues. The predetermined groups 40a will be referred to herein as a "virtual concatenation group" or "VCG."

When bits representative of a packet are received and/or stored within one of the virtual queues, the distribution engine 36a converts the bits into a bit stream as discussed above, and then sprays or provides the bits into the predetermined group 40a of ODU containers 46a-n. For example, assume that the packet has a destination address indicating that such packet is directed to New York. The ethernet switch 26 will assign and store the packet into the virtual queue. The distribution engine 36a that is monitoring the virtual queue will then separate the packet into bits, add deskewing markers (as will be discussed in more detail with reference to FIGS. 5 and 6) and then provide or transmit the bits, preferably in a round-robin fashion, to the predetermined group 40a of ODU containers 46a-n for transmission to the destination node 16a located in New York.

In other words, ethernet switch 26 functions to assign and store packets into a virtual queue based on destination, and the distribution engine 36a functions to separate the packets into bits, and then provide the bits to a virtual concatenation group comprising a predetermined group 40a of ODU containers 46a-n associated with a particular destination. In this way, when two or more packets are received by a node according to the instant disclosure, a first packet having a first destination address and a first bit and a second bit may be assigned and stored into a first virtual queue, separated into bits, and the bits are provided or otherwise transmitted to a first predetermined group of optical channel data unit containers and/or mapped into optical channel data unit containers. Similarly, a second packet having a second destination address and a third bit and a fourth bit may be assigned and stored into a second virtual queue, separated into bits, and the bits provided or otherwise transmitted to a second predetermined group of optical channel data unit containers and mapped into optical channel data unit containers.

The distribution engine 36a also encodes a channel ID for mapping the bits to the logical virtual concatenation group over ODU timeslots preferably by using VCAT. The distribution engine 36a evenly distributes, or "sprays" the bits (or groups of bits) from each virtual queue into the plurality of ODU containers 46a-n, and may use low granularity ODU containers such as ODU0 or ODU1, for example, depending on optical link capacity, network requirements, projected traffic pattern, and any other pertinent considerations. Alternatively, the distribution engine 36a may distribute the bits at bit-by-bit granularity to the plurality of ODU containers 46a-n having arbitrary data rates, such as those identified in the art as "ODUflex" containers. The ODU containers 46a-n may have arbitrary data rates, such as ODUflex, and containers having fixed data and/or data rates such as low granularity ODU containers. The distribution engine 36a may use VCAT to group the ODU containers 46a-n into the predetermined group 40a. The distribution engines 36a-n may insert periodic deskewing markers 94 into the bits to allow for deskewing and packet reconstruction at the destination node 16.

It is to be understood that the term "bytes" as used herein may refer to a single byte or a plurality of bytes transmitted and/or received as a cluster of bytes representing a data packet fragment. It is to be further understood that the term "bit" as used herein refers to a single bit or a plurality of bits transmitted and/or received as a cluster of bits representing a codeword.

By way of example, The destination node 16a receives optical channel data unit containers 46a-n from a plurality of circuits such as TDM circuits transmitted on one or more of the links 20a and 20c via the passive optical de-mux 78. Next, the demodulators 77a-e of the optical port 54 receive the optical channel data unit containers 46a-n from the passive optical de-mux 78. The demodulators 77a-e preferably convert the optical signals transported over the one or more links 20a and 20c into electrical signals, which electrical signals are transmitted to the de-multiplexer 76a-n. Next, the optical channel data unit containers are transmitted to the ODU cross-connect 68 via the busses 81a-n. The concatenation engine 64 knows the number of circuits (in this example 2) within the VCG, and reconstructs the packets from the data streams utilizing the deskewing markers 94 inserted by the source node 12. It is expected that containers belonging to the same VCG may traverse the network through different fibers and/or intermediate nodes 14a and be received at different times by the destination node 16a. The destination node 16a desirably uses a deskew buffer 200a-n to store the data streams during any potential differential delay caused by the different paths taken by containers from the same VCG. The concatenation engines 64a-n of the destination node 16 may utilize the deskew buffers 200a-n to temporarily store the information while the packets are being reconstructed. The packets are then provided to the ethernet switch 52 for transmission onto a packet switched network via the one or more media access controls 24a-n and physical interfaces 23a-n.

The term "bit spraying" as used herein refers to providing or otherwise transmitting bits to form the ODU containers 46a-n to be transported over a plurality of circuits via one or more of the plurality of multiple circuits on the links 20a-d. For example, when the node functions as the source node 12, the distribution engines 36a, for example, can operate to map packet flows from the virtual queue into the ODU containers 46a-n by mapping a first bit into the ODU container 46a, a second bit into the ODU container 46n, a third bit into the ODU container 46a, a fourth bit into the ODU container 46n, and so on, preferably in a round-robin fashion until a sufficient number of the bits have been mapped into the ODU containers 46a-n that can be transported via one or more of the links 20a-d and transmits such ODU containers 46a-n to the optical port 28. Once this has been accomplished, the process repeats with the distribution engine 36a continuing to map bits from packets flows into the ODU containers 46a-n as described above.

The term "deskewing marker insertion" refers to data and/or bits being added to the optical channel data unit containers to permit deskewing and reconstruction of the bits within the optical data units into packets at the destination node 16.

Figure 5:
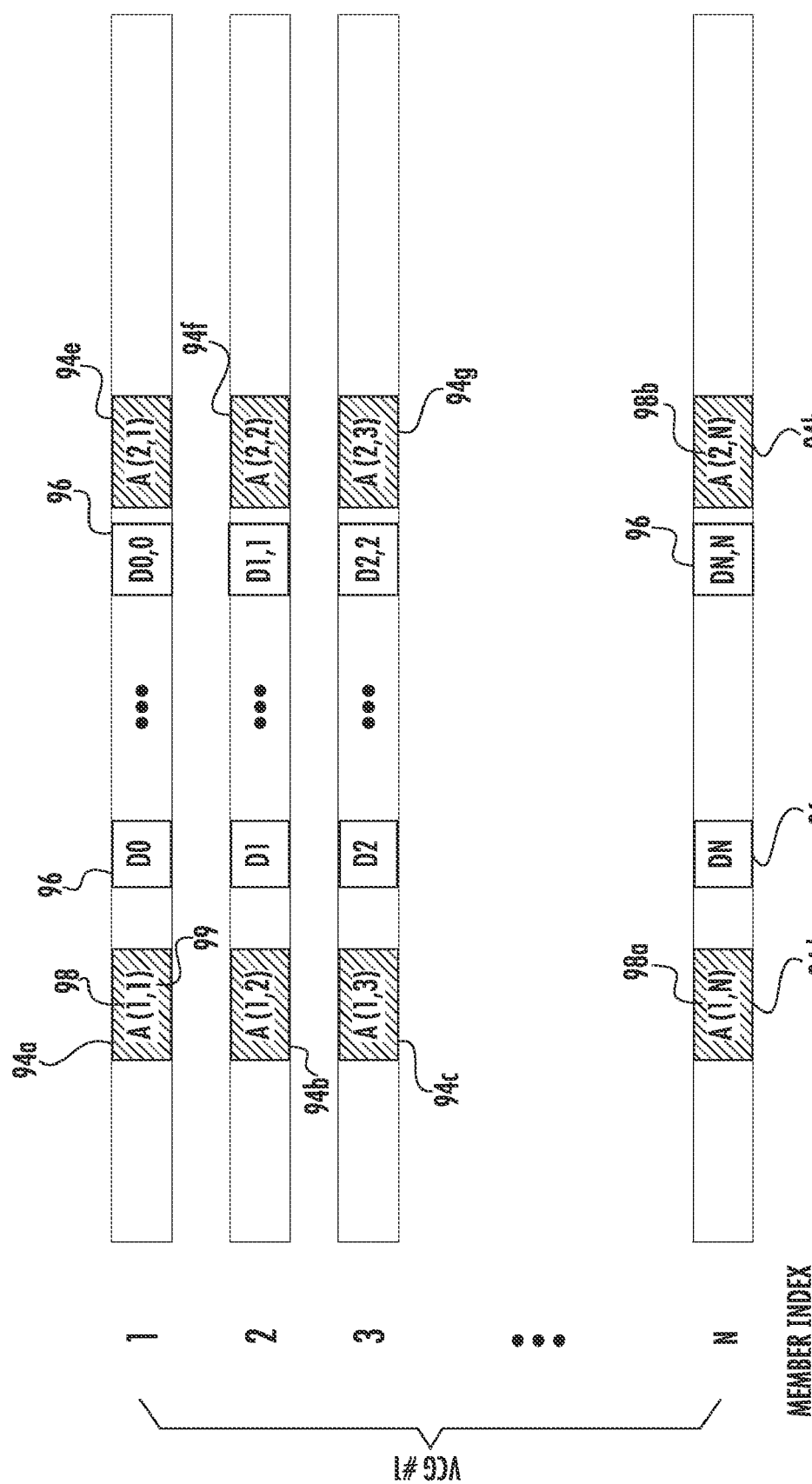
FIG. 5 is a diagram showing an embodiment of a deskewing marker insertion method at the source node according to the present disclosure.

Referring now to FIG. 5, deskewing can be accomplished by inserting periodic deskewing markers 94a-h into the data stream forming the optical data units. For example, deskewing markers 94a-h inserted into the VCG members may include a Global Sequence Identifier 98a-b and a member sequence identifier 99 (only the global sequence identifier and member sequence identifier for the deskewing marker 94a is numbered for purposes of clarity.). The member sequence identifier 99 identifies the sequence of the individual members (e.g. particular groups 40a-n) of the VCG, and is used when reconstructing the packets at the destination node 16. The code words 96 are numbered D1-DN, and preferably the code words 96 which comprise a VCG group contain a fixed and equal number of bits each. A first set of deskewing markers 94 can be inserted into the bits comprising a first VCG group, and a second set of deskewing markers 94 can be inserted into the bits comprising a second VCG group.

The Global sequence identifier 98 is inserted at pre-determined insertion ticks (periods of time between deskewing marker insertions) into the data streams at each group 40a-n at exactly the same time. The global sequence identifier 98 is desirably included in all inserted deskewing markers 94, and is incremented with each inserted deskewing marker 94. For example, the first inserter global sequence identifier 98a is shown as "1" within the deskewing marker 94a, and a second global sequence identifier 98 is shown as "2" within the deskew marker 94e. The global sequence identifiers 98 can be incremented in this fashion. The member sequence identifier 99 indicates the number and sequence of the VCG members to be transmitted.

Figure 6:
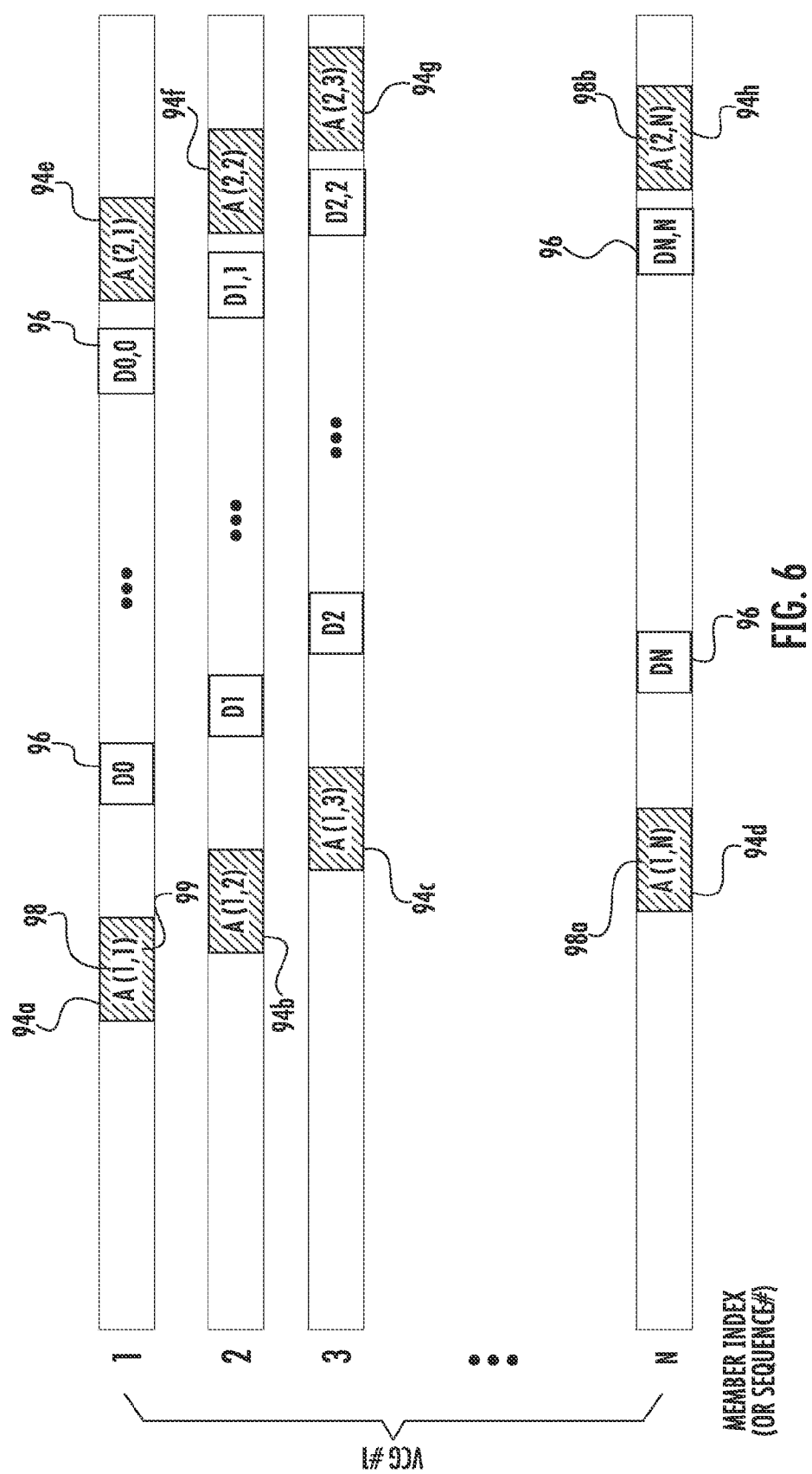
FIG. 6 is another diagram showing one possible implementation of an embodiment of the deskewing marker insertion method according to the present disclosure in which the diagram illustrates the timing of the deskewing markers received at the destination node.

Referring now to FIG. 6, the member sequence identifier 99 allows the destination node 16 to re-sequence the received data by indicating the order in which data was distributed among VCG members. The global sequence identifier 98 indicates the time relationship between deskewing markers 94 which were inserted by the source node 12 at the same instant into multiple data streams. Data can be stored in the deskew buffer until all VCG members have been received. The data is then reconstructed, preferably by one of the concatenation engines 64a-n, by aligning the bits from various VCG members according to the global sequence identifier 98, and using the member sequence identifiers 99 to reconstruct or otherwise reassemble bits into packets in the correct order.

As will be appreciated by persons of ordinary skill in the art presented with the instant disclosure, the deskewing markers 94 disclosed herein may be inserted in various locations in the ODU/ODUflex containers, such as the overhead area and/or the payload area. The deskewing markers 94 may be inserted into the overhead in order to minimize payload bandwidth usage. The deskewing markers 94 may be inserted into the ODU/ODUflex payload, rather than the overhead.

As will be appreciated by a person of ordinary skill in the art presented with the instant disclosure, the ODU containers used to form the VCG are preferably of the same granularity, in order to simplify the spraying and combination process. As an example, a VCG having a heterogeneous mix of ODU container sizes may require a more complex mapping and de-mapping process, where bits may not be necessarily de-mapped on a round-robin basis as described above. The instant invention allows the use of any size ODUflex containers, but preferably all ODUflex containers have the same rate.

The number of physical links 20a-e can be varied (i.e., increased or decreased) depending upon the bandwidth requirements. In addition, the alignment insertion can be accomplished by inserting data with the first and second bits, for example, to facilitate reconstruction of the packets at the destination node 16. When the node functions as the destination node 16, the concatenation engines 64a-n can operate to reconstruct the bits into packets by deskewing the bits via the deskewing markers 94 inserted by the source node 12 and combining the bits (or other chosen fragments) into packets, which packets are then preferably grouped into virtual queues for each destination. A person of ordinary skill in the art presented with the instant disclosure will recognize other hardware and/or software configurations which can be readily implemented without departing from the scope of the inventive concept(s) disclosed herein.

One advantage of a network constructed in accordance with the present disclosure is that the traffic distribution is application-agnostic; the traffic can be spread evenly without reading the packets. This is achieved because the distribution engine 36a, for example, does not need to read the packets, but simply distribute the bits from the packets to the predetermined group 40a of ODU containers 46a-n, that are thereby organized into logical groups similar to VCAT groups. The bits can then be transmitted to a pre-established group 40a of ODU containers 46a-n (e.g. of a VCAT group) at a bit-by-bit (or groups of bits) granularity by evenly dividing the bits among all of the ODU containers 46a-n within the predetermined group 40a. A network according to the present disclosure may support ODUj and/or ODUflex VCAT or VCAT-like groups with different member sizes and constraints, but all members within each individual group would desirably have the same granularity.

Another advantage of the inventive concept disclosed herein is the added flexibility, which allows the network operator to optionally change the number of members in each VCAT group or adjust the ODU/ODUflex container size—with the understanding that the rate for all ODUflex members would be adjusted to the same value.

A network constructed in accordance with the instant disclosure would desirably maintain adequate buffering space and use the periodic deskewing markers to deskew and reconstruct packets at the destination node 16. The deskew buffer space needed however may be largely reduced compared to packet switches.

As it will be appreciated by persons of ordinary skill in the art, while the flow of traffic is described only in one direction, a network according to the present disclosure can have traffic flowing both ways at the same time by simply providing the functionality of the destination node 16 with the functionality of the source node 12, along with any necessary hardware and/or processor executable code to achieve such functionality.

As will be appreciated by persons of ordinary skill in the art, changes may be made in the construction and the operation of the various components, elements, and assemblies described herein or in the steps or the sequence of steps of the methods described herein without departing from the spirit and scope of the inventive concept(s) disclosed herein.

From the above description, it is clear that the inventive concept(s) disclosed herein is well adapted to carry out the objects and to attain the advantages mentioned herein as well as those inherent in the inventive concept(s) disclosed herein. While presently preferred embodiments of the inventive concept(s) disclosed herein have been described for purposes of this disclosure, it will be understood that numerous changes may be made which will readily suggest themselves to those skilled in the art and which are accomplished within the spirit of the inventive concept(s) disclosed and claimed herein.

What is claimed is:

1. A node comprising:
   a packet network interface adapted to receive a packet having a destination address and a first bit and a second bit;
   an ethernet switch adapted to receive and forward the packet into a virtual queue associated with a destination;
   an optical port having circuitry for transmitting to a plurality of circuits; and
   a distribution engine having one or more processors configured to execute processor executable code to cause the distribution engine to (1) reads a first bit and a second bit from the virtual queue, (2) provide the first bit and the second bit to the at least one optical port for transmission to a first predetermined group of the plurality of circuits.

2. The node of claim 1, wherein the predetermined group of the plurality of circuits comprises a first and a second circuit, and wherein the first bit is provided to the first circuit and the second bit is provided to the second circuit.

3. The node of claim 1, wherein the distribution engine further provides a first set of deskewing markers to the at least one optical port indicating a first sequence of the first bit and the second bit to the predetermined group of the circuits.

4. The node of claim 1, wherein the first bit is mapped into a first arbitrary rate optical channel data unit container, and the second bit is mapped into a second arbitrary rate optical channel data unit container, and wherein the first and second arbitrary rate optical channel data unit containers have a same data rate.

5. The node of claim 1, wherein the first bit is mapped into a first fixed rate optical channel data unit container, and the second bit is mapped into a second fixed rate optical channel data unit container, and wherein the first and second fixed rate optical channel data unit containers have a same data rate.

6. The node of claim 1, wherein the distribution engine provides the first bit and the second bit to the at least one optical interface in a predetermined sequence.

7. The node of claim 1, wherein the predetermined sequence is a round-robin fashion.

8. A method, comprising the steps of:
   receiving a packet by circuitry of a node;
   storing, with an ethernet switch, the packet into a first virtual queue according to a destination of the packet;

mapping first and second bits from the packet within the first virtual queue into a first predetermined group of optical channel data unit containers within a first virtual concatenated group; and transmitting the first group of optical channel data unit containers within the first virtual concatenated group to a first destination node.

9. The method of claim 8, wherein the step of mapping the first bit and the second bit from the packet within the first virtual queue further comprises adding deskewing markers into the first predetermined group of optical channel data unit containers.

10. The method of claim 9, further comprising the step of reconstructing the packet at the first destination node from multiple data streams extracted from the first set of optical channel data unit containers using the deskewing markers.

11. The method of claim 8, wherein the optical channel data unit containers have one or more of an arbitrary data rate selected by an operator and a fixed data rate.

12. A node comprising:
a packet network interface adapted to receive a plurality of packets, at least a first packet having a first destination address and a first bit and a second bit, and a second packet having a second destination address and a third bit and a fourth bit;
an optical port including circuitry adapted to transmit to a plurality of circuits;
an ethernet switch adapted to receive and forward the first packet to a first virtual queue being associated with a first predetermined group of a plurality of circuits, and the second packet to a second virtual queue associated with a second predetermined group of the plurality of circuits; and
a distribution engine having one or more processors configured to execute processor executable code to cause the distribution engine to (1) provide the first bit and the second bit to the optical port for transmission to the first predetermined group of the plurality of circuits, and (2) provide the third bit and the fourth bit to the optical port for transmission to the second predetermined group of the plurality of circuits.

13. The node of claim 12, wherein the first predetermined group of the plurality of circuits comprises a first and a second circuit, and wherein the first bit is provided to the first circuit and the second bit is provided to the second circuit.

14. The node of claim 12, wherein the distribution engine further provides a first set of deskewing markers to the optical port indicating a first sequence of the first bit and the second bit to the first predetermined group of the circuits, and provides a second set of deskewing markers to the optical port indicative of a second sequence of the third bit and the fourth bit to the second predetermined group of the circuits.

15. The node of claim 12, wherein the first bit is mapped into a first arbitrary rate optical channel data unit container, and the second bit is mapped into a second arbitrary rate optical channel data unit container, and wherein the first and second arbitrary rate optical channel data unit containers have a same data rate.

16. The node of claim 12, wherein the first bit is mapped into a first fixed rate optical channel data unit container, and the second bit is mapped into a second fixed rate optical channel data unit container, and wherein the first and second fixed rate optical channel data unit containers have a same data rate.

17. The node of claim 12, wherein the distribution engine provides the first bit and the second bit to the optical port in a predetermined sequence.

18. The node of claim 17, wherein the predetermined sequence is a round-robin fashion.

19. A method, comprising the steps of:
receiving a first packet and a second packet by circuitry of a node;
storing, with an ethernet switch, the first packet into a first virtual queue according to a first destination of the first packet, and the second packet into a second virtual queue according to a second destination of the second packet;
mapping, by a distribution engine comprising one or more processors, first and second bits from the first packet within the first virtual queue into a first group of optical channel data unit containers within a first virtual concatenated group;
mapping, by the distribution engine, second and third bits from the second packet within the second virtual queue into a second group of optical channel data unit containers within a second virtual concatenated group;
transmitting the first group of optical channel data unit containers within the first virtual concatenated group to a first destination node; and
transmitting the second group of optical channel data unit containers within the second virtual concatenated group to a second destination node.

20. The method of claim 19, wherein the step of mapping the first bit and the second bit from the first packet within the first virtual queue further comprises adding deskewing markers into the first group of optical channel data unit containers.

21. The method of claim 20, further comprising the step of reconstructing the first packet at the first destination node from multiple data streams extracted from the first group of optical channel data unit containers using the deskewing markers.

22. The method of claim 21 wherein the optical channel data unit containers have one or more of an arbitrary data rate selected by an operator and a fixed data rate.

* * * * *